(12) United States Patent
Cho et al.

(10) Patent No.: US 7,617,168 B2
(45) Date of Patent: Nov. 10, 2009

(54) APPARATUS AND METHOD FOR CONTROLLING PORTABLE DEVICE

(75) Inventors: Sung-jung Cho, Yongin-si (KR); Kee-eung Kim, Seoul (KR); Joon-ah Park, Seoul (KR); Wook Chang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 446 days.

(21) Appl. No.: 11/528,347

(22) Filed: Sep. 28, 2006

(65) Prior Publication Data

US 2007/0083372 A1 Apr. 12, 2007

(30) Foreign Application Priority Data

Oct. 11, 2005 (KR) .................. 10-2005-0095633

(51) Int. Cl.
*G06N 5/04* (2006.01)

(52) U.S. Cl. .................. 706/45; 706/20; 708/146

(58) Field of Classification Search .................. 706/11, 706/14, 15, 20, 21, 45; 708/100, 146; 715/700–702, 715/764, 862–864
See application file for complete search history.

(56) References Cited

U.S. PATENT DOCUMENTS

| | | | | |
|---|---|---|---|---|
| 4,849,732 A | * | 7/1989 | Dolenc .................. | 341/20 |
| 5,483,235 A | * | 1/1996 | Hanson et al. .................. | 341/20 |
| 5,893,059 A | | 4/1999 | Raman .................. | 704/256 |
| 6,144,976 A | * | 11/2000 | Silva et al. .................. | 708/100 |
| 6,243,677 B1 | | 6/2001 | Arslan et al. .................. | 704/244 |
| 6,259,436 B1 | * | 7/2001 | Moon et al. .................. | 345/173 |
| 6,266,685 B1 | * | 7/2001 | Danielson et al. .................. | 708/141 |
| 6,778,959 B1 | | 8/2004 | Wu et al. .................. | 704/256 |
| 2002/0118176 A1 | * | 8/2002 | Ribak .................. | 345/169 |
| 2004/0100454 A1 | * | 5/2004 | Kang et al. .................. | 345/173 |

FOREIGN PATENT DOCUMENTS

| | | |
|---|---|---|
| JP | 2003153343 | 5/2003 |
| JP | 2004110453 | 4/2004 |
| KR | 1020000071367 | 11/2000 |
| KR | 1020030083450 | 10/2003 |
| KR | 1020040051202 | 6/2004 |
| KR | 1020050034940 | 4/2005 |

* cited by examiner

*Primary Examiner*—David R Vincent
*Assistant Examiner*—Omar F Fernandez Rivas
(74) *Attorney, Agent, or Firm*—Staas & Halsey LLP

(57) ABSTRACT

An apparatus and method for controlling a portable device. An apparatus for controlling a portable device includes: a touch sensor which comprises at least one touch cell which is chosen by a touch of a user; a first calculation unit which calculates a first probability value while taking dependency relationships among the chosen at least one touch cell into consideration; a second calculation unit which calculates a second probability value without taking the dependency relationships among the chosen at least one touch cell into consideration; a determination unit which determines whether a current touch cell combination of the chosen at least one touch cell is a registered touch cell combination or an unregistered touch cell combination with reference to the first probability value and the second probability value; and an output unit which outputs a function execution signal according to the results of the determining.

28 Claims, 7 Drawing Sheets

FIG. 2

ARBITRARY HANDGRIP POSTURE

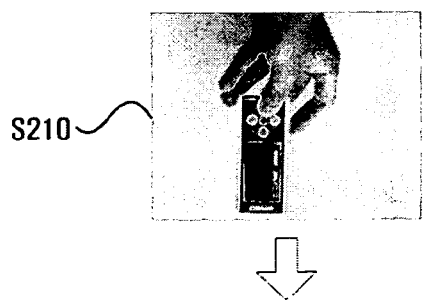

S210

⇩

SENSE TOUCH CELLS CHOSEN BY USER

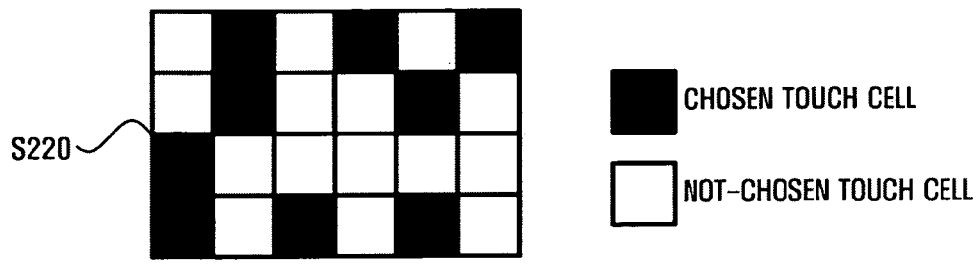

S220

■ CHOSEN TOUCH CELL

☐ NOT-CHOSEN TOUCH CELL

TAKE DEPENDENCY RELATIONSHIPS INTO CONSIDERATION ⇙    ⇘ TAKE NO DEPENDENCY RELATIONSHIPS INTO CONSIDERATION

200a — FIRST PROBABILITY VALUE        SECOND PROBABILITY VALUE — 200b

⇘    ⇙

COMPARE FIRST AND SECOND PROBABILITY VALUES — S230

⇩

DETERMINE WHETHER ARBITRARY HANDGRIP POSTURE IS REGISTERED HANDGRIP POSTURE OR UNREGISTERED HANDGRIP POSTURE

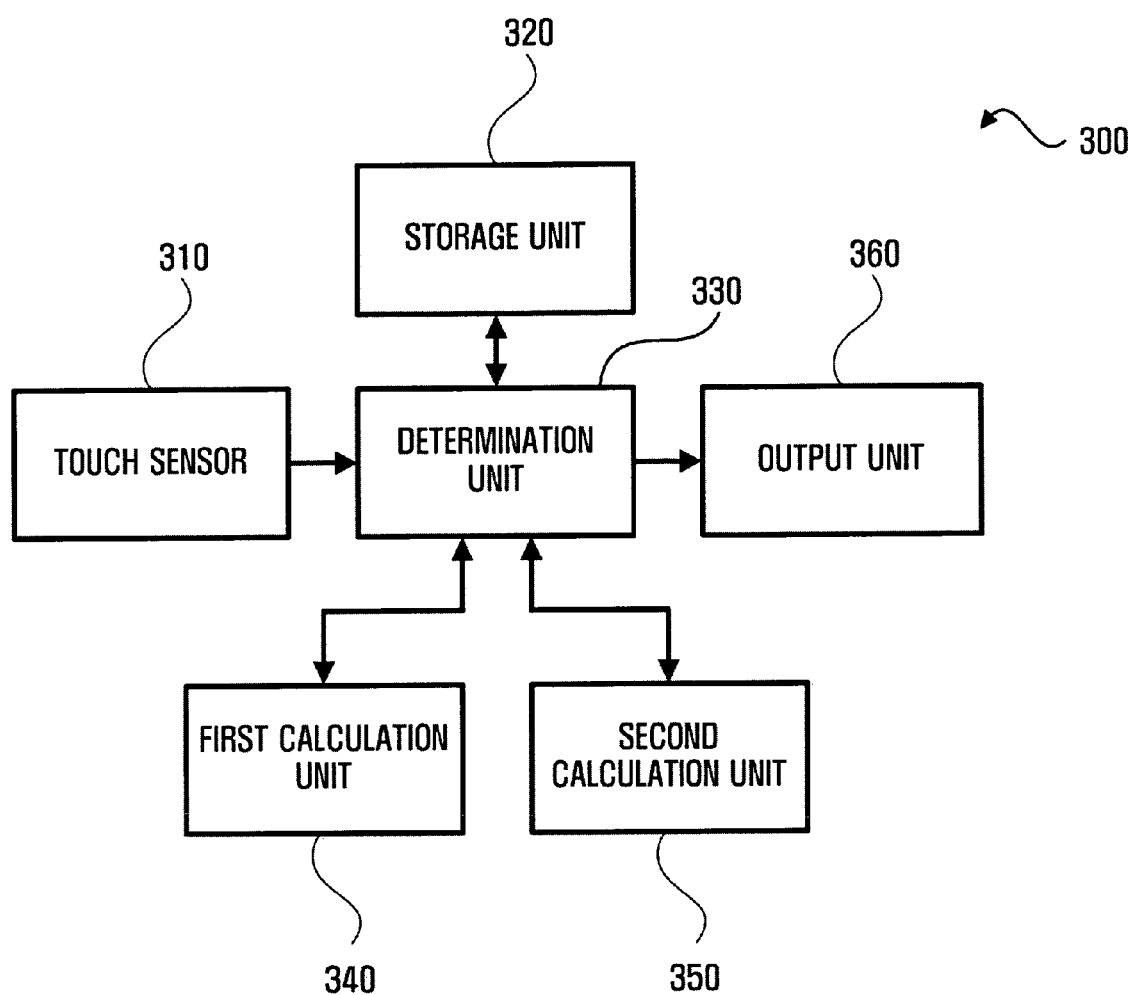

FIG. 4
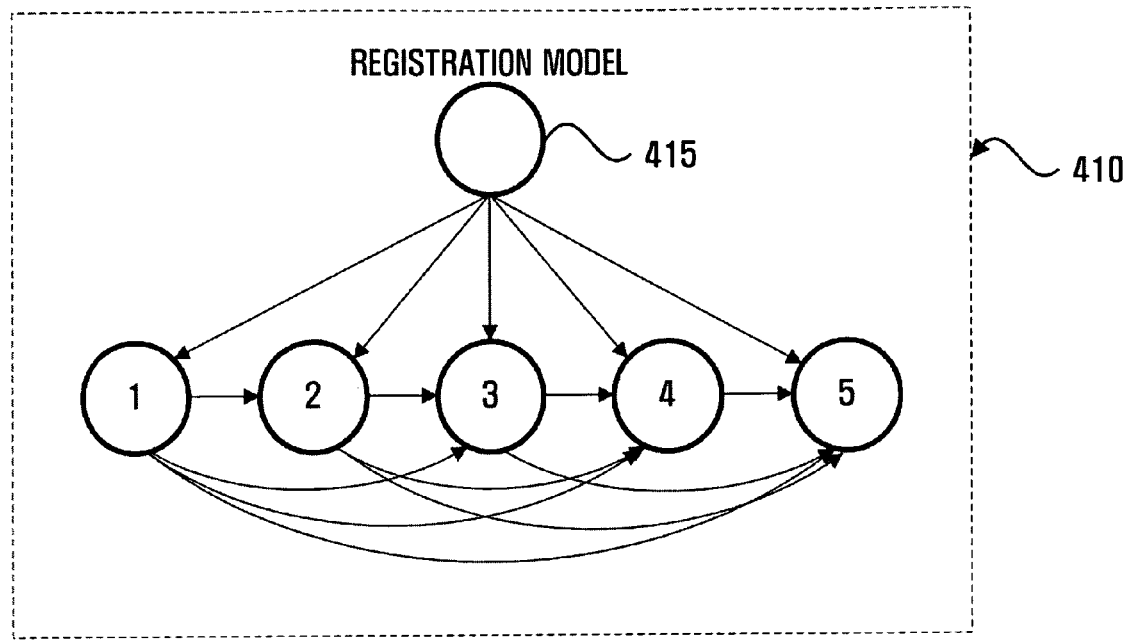
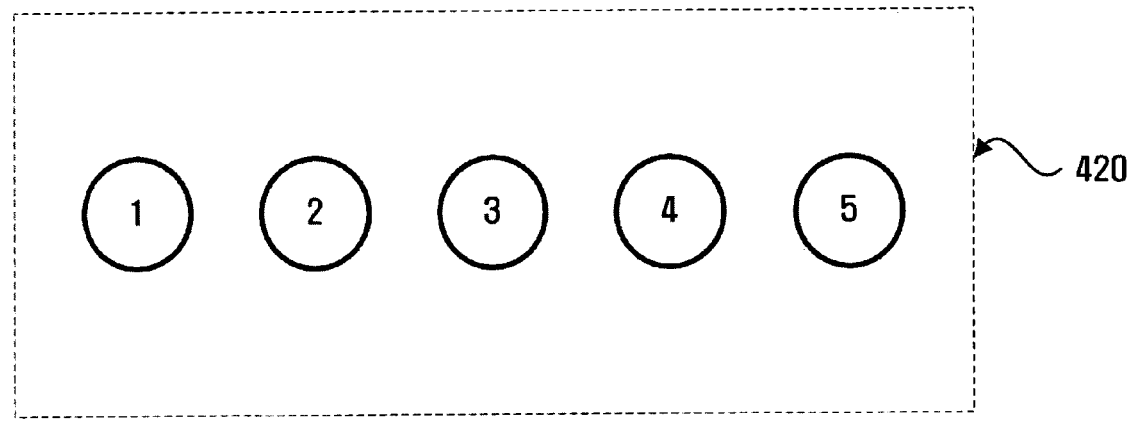

FIG. 7
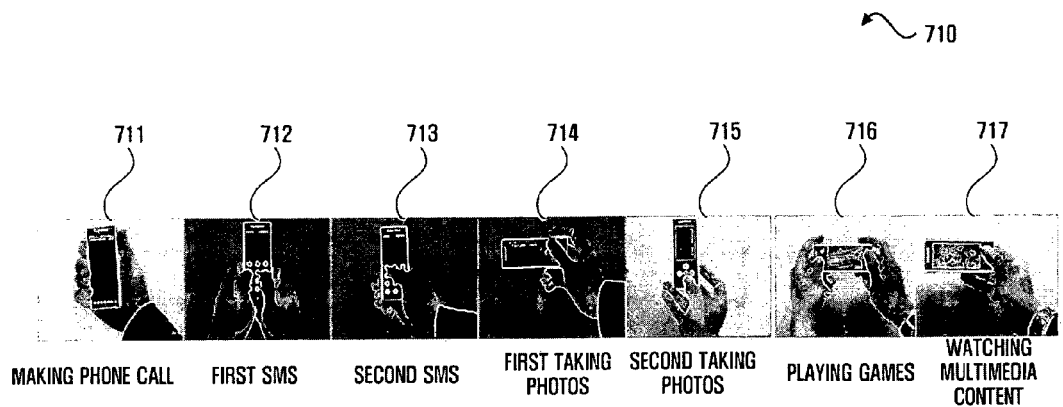
MAKING PHONE CALL | FIRST SMS | SECOND SMS | FIRST TAKING PHOTOS | SECOND TAKING PHOTOS | PLAYING GAMES | WATCHING MULTIMEDIA CONTENT
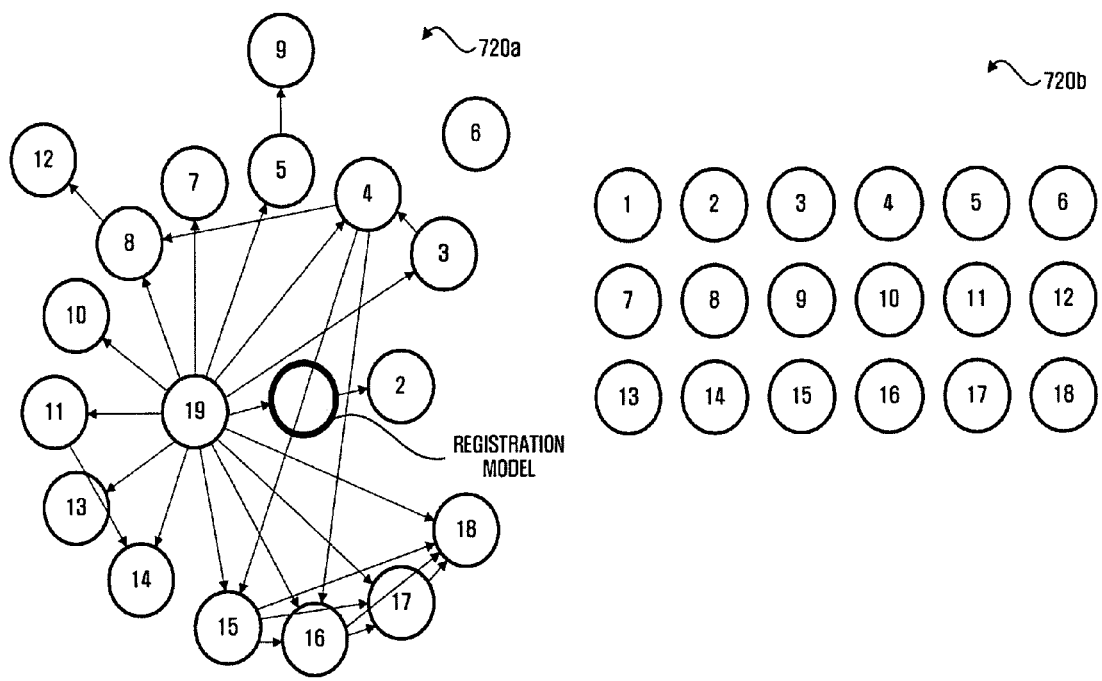

APPARATUS AND METHOD FOR CONTROLLING PORTABLE DEVICE

CROSS-REFERENCE TO RELATED APPLICATION

This application claims priority from Korean Patent Application No. 10-2005-095633 filed on Oct. 11, 2005 in the Korean Intellectual Property Office, the disclosure of which is incorporated herein by reference.

BACKGROUND OF THE INVENTION

1. Field of the Invention

The present invention relates to an apparatus and method for controlling a portable device, and more particularly, to an apparatus and method for controlling a portable device that performs a plurality of functions respectively corresponding to a plurality of registered handgrip postures adopted by a user, the apparatus and method extracting probability information of an unregistered handgrip posture using probability information of a registered handgrip posture, comparing the probability information of the unregistered handgrip posture with the probability information of the registered handgrip posture, and determining whether to perform a predetermined function according to the results of the comparison.

2. Description of Related Art

Recent developments in integration technology have opened the way for the spread of various portable devices such as audio reproduction apparatuses (e.g., cassette tape players and CD players), wireless pagers, mobile phones, MP3 players, and portable game players.

In particular, mobile phones are no longer only tools for telecommunications but are also tools for providing a variety of multimedia functions such as a digital camera function and an MP3 player function.

Also, since the advent of storage media such as flash memories, portable devices such as MP3 players have become more widespread. Also, nowadays, customers pay more attention than ever to aesthetic aspects of portable devices as well as to functional aspects of the portable devices.

In view of these developments, a variety of materials have been used for portable device cases in order to meet various user demands, and an increasing number of customers are willing to buy additional portable device cases for their portable devices for protection and aesthetic purposes.

Examples of the materials of portable device cases include plastics, rubber, and leather. Portable device cases are generally manufactured to conform to the shape of portable devices that they are intended to encase. For example, portable device cases for mobile phones or MP3 players equipped with a liquid crystal display (LCD) window may include an opening or may be formed of a transparent material so that users can always examine a graphic interface displayed on the screen of the LCD window without removing the portable device cases. Nowadays, most portable devices are equipped with one or more buttons, and thus, an increasing number of portable device cases are designed to include an opening through which buttons on portable devices can be exposed.

With improvements in the design of portable devices and a diversity of user preferences regarding portable devices, portable devices equipped with a touch sensor have been developed and are increasingly replacing traditional portable devices equipped with a number of buttons that allow users to input user commands. Touch sensors may be comprised of a plurality of touch cells. When a user grabs, with his/her hands, a portable device equipped with a touch sensor comprising a plurality of touch cells, the touch cells are selectively chosen according to a handgrip posture adopted by the user. Then the portable device recognizes the pattern of a touch cell combination resulting from the selectively choosing, and performs a predetermined function according to the results of the recognition. In this manner, portable devices equipped with a touch sensor can facilitate the input of user commands.

FIG. 1 is a diagram illustrating a plurality of functions of a typical portable device equipped with a touch sensor that comprises a plurality of touch cells and a plurality of handgrip postures adopted by a user to perform the respective functions of the typical portable device. Referring to FIG. 1, the portable device may perform different functions according to a handgrip posture adopted by the user when the user holds the portable device with his/her hands. In other words, the pattern of a combination of touch cells chosen from the touch sensor by the user varies from one handgrip posture to another of the user. The portable device performs its functions according to the pattern of a touch cell combination resulting from the touching of the touch sensor by the user.

For example, when the user adopts a handgrip posture 10 for making a phone call, the portable device places a call to a predefined phone number or receives an incoming call. When the user adopts a handgrip posture 20 for inputting text messages using a short message service (SMS), the portable device displays a screen image for inputting text messages. When the user adopts a handgrip posture 30 for taking photos, the portable device performs a photographing operation. When the user adopts a handgrip posture 40 for playing games, the portable device displays a game screen.

As described above, portable devices equipped with a touch sensor determine a function corresponding to a touch cell combination that results from a handgrip posture adopted by a user, and performs a predetermined function according to the results of the determination. However, a user may adopt different handgrip postures, even for the same function of a portable device. Accordingly, portable devices may perform the same function for a certain range of handgrip postures in consideration of errors (deviations in handgrips) in predefined touch cell combinations. However, it is difficult to determine an allowable deviation range for a touch cell combination resulting from a registered handgrip posture. If the deviation range is too narrow, portable devices may not be able to perform functions in response to registered handgrip posture adopted by a user. Conversely, if the error range is too wide, portable devices may perform functions in response to unregistered handgrip postures.

Korean Patent Laid-Open Gazette No. 2000-071367 discloses a voice recognition system which generates variable rejection strictness as a function of at least one background noise level measured during training and noise signal measurements obtained during a recognition mode, and initiates a valid voice recognition operation. This voice recognition system prevents invalid utterances from being associated with a previously stored voice model and facilitates the detection of valid utterances.

The voice recognition system of Korean Patent Laid-Open Gazette No. 2000-071367, however, determines whether an input voice signal is valid simply based on the previously voice model without specifying signals in what range can be determined to be valid.

Given all this, it is necessary to develop methods and apparatuses which extract information regarding handgrip postures that can prevent a portable device from performing its functions from information regarding a limited number of registered handgrip postures and can thus prevent the portable devices from performing its functions in response to unregistered handgrip postures.

BRIEF SUMMARY

An aspect of the present invention provides an apparatus and method for controlling a portable device that performs a plurality of functions respectively corresponding to a plurality of registered handgrip postures adopted by a user. The apparatus and method extract probability information of an unregistered handgrip posture using probability information of a registered handgrip posture, compare the unregistered handgrip posture probability information with the registered handgrip posture probability information, and determine whether to perform a predetermined function according to the results of the comparison.

According to an aspect of the present invention, there is provided an apparatus for controlling a portable device. The apparatus includes: a touch sensor which comprises at least one touch cell which is chosen by a touch of a user; a first calculation unit which calculates a first probability value while taking dependency relationships among the chosen at least one touch cell into consideration; a second calculation unit which calculates a second probability value without taking the dependency relationships among the chosen at least one touch cell into consideration; a determination unit which determines whether a current touch cell combination of the chosen at least one touch cell is a registered touch cell combination or an unregistered touch cell combination with reference to the first probability value and the second probability value; and an output unit which outputs a function execution signal according to the results of the determining performed by the determination unit.

According to another aspect of the present invention, there is provided a method of controlling a portable device. The method includes: obtaining a current touch cell combination by identifying one or more touch cells which are touched by a user; calculating a first probability value while taking dependency relationships among the touched touch cells into consideration; calculating a second probability value without taking the dependency relationships among the touched touch cells into consideration; determining whether the current touch cell combination is a registered touch cell combination or an unregistered touch cell combination with reference to the first probability value and the second probability value; and outputting a function execution signal according to the results of the determining.

According to another aspect of the present invention, there is provided a method of controlling a portable device. The method includes: identifying a touch cell combination of touched ones of a plurality of touch cells; calculating a first probability value while taking dependency relationships among the touch cells of the touch cell combination into consideration and calculating a second probability value without taking the dependency relationships among the touch cells of the touch cell combination into consideration; determining whether the touch cell combination is a registered touch cell combination or an unregistered touch cell combination, the touch cell combination being registered when the first probability value is greater than the second probability value, the touch cell being an unregistered touch cell combination when the second probability value is greater than the first; and outputting a control command controlling an operation of the apparatus, the command corresponding to the touch cell combination, when the touch cell combination is a registered touch cell combination.

According to another aspect of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2 is a diagram illustrating a method of extracting an unregistered handgrip posture according to an embodiment of the present invention;

FIG. 3 is a block diagram of an apparatus for controlling a portable device according to an embodiment of the present invention;

FIG. 4 is a diagram of a registration model for calculating probability values for a registered touch cell combination and for an unregistered touch cell combination according to an embodiment of the present invention;

FIG. 7 presents experimental results obtained using a plurality of registered touch cell combinations and a plurality of unregistered touch cell combinations according to an embodiment of the present invention.

DETAILED DESCRIPTION OF EMBODIMENTS

Figure 1:
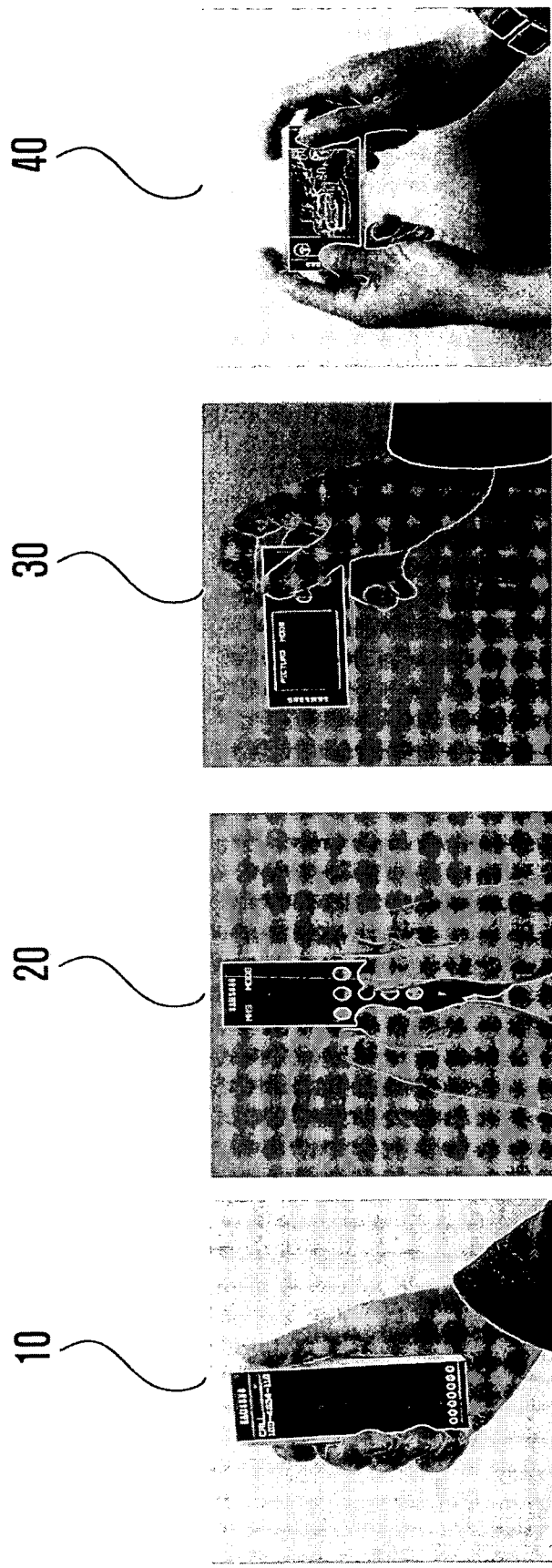
FIG. 1 is a diagram illustrating a plurality of handgrip postures and a plurality of functions of a typical portable device respectively corresponding to the handgrip postures.

Reference will now be made in detail to embodiments of the present invention, examples of which are illustrated in the accompanying drawings, wherein like reference numerals refer to the like elements throughout. The embodiments are described below in order to explain the present invention by referring to the figures.

The plurality of blocks of the accompanying block diagram and the plurality of operational steps of the accompanying flowcharts may be executed by computer program instructions. The computer program instructions may be uploaded to general purpose computers, special purpose computers, or processors of other programmable data processing devices. When being executed by general purpose computers, special purpose computers, or processors of other programmable data processing devices, the computer program instructions can implement in various ways the functions specified in the accompanying block diagram or flowcharts.

Also, the computer program instructions can be stored in computer-readable memories and/or storage media which can direct computers or other programmable data processing devices to function in a particular manner. When stored in computer-readable memories, the computer program instructions can produce an article of manufacture including instruction means which implement the functions specified in the accompanying block diagram and flowcharts. The computer program instructions may also be loaded onto computers or other programmable data processing devices to allow the computers or other programmable data processing devices to realize a series of operational steps and to produce computer-executable processes. Thus, when being executed by computers or other programmable data processing devices, the computer program instructions provide steps for implementing the functions specified in the accompanying block diagram and flowcharts.

The blocks of the accompanying block diagram or the operational steps of the accompanying flowcharts may be represented by modules, segments, or portions of code which comprise one or more executable instructions for executing the functions specified in the respective blocks or operational steps of the accompanying block diagram and flowcharts. The functions specified in the accompanying block diagram and flowcharts may be executed in different orders from those set forth herein. For example, two adjacent blocks or operational steps in the accompanying block diagram or flowcharts may be executed at the same time or in a different order from that set forth herein.

FIG. 2 is a diagram illustrating a method of extracting an unregistered handgrip posture according to an embodiment of the present invention. This method is described with concurrent reference to an apparatus for controlling a portable device for ease of explanation only.

Referring to FIG. 2, in operation S210, when a user grabs, with his/her hands, an apparatus for controlling a portable device by adopting an arbitrary handgrip posture, one or more touch cells of a touch sensor included in the apparatus are touched, and are thus chosen. That is, the touched cells, and only the touched cells, of the one or more touch cells are chosen. In operation S220, the apparatus detects a touch cell combination of the touched cells (hereinafter referred to as the current touch cell combination) resulting from the arbitrary handgrip posture, and calculates first and second probability values 200a and 200b for the current touch cell combination based on occurrence number information specifying the number of occurrences of the current chosen touch cell combination.

Dependency relationships exist among a plurality of touch cells in a touch cell combination corresponding to a registered handgrip posture, whereas no dependency relationships exist among a plurality of touch cells in a touch cell combination corresponding to an unregistered handgrip posture. Statistically, when dependency relationships exist among a plurality of touch cells, a probability value regarding one touch cell is likely to be affected by a probability value regarding another touch cell.

Therefore, the apparatus calculates the first probability value 200a for the current touch cell combination while taking dependency relationships, if any, among the touch cells in the current touch cell combination into consideration, and calculates the second probability value 200b without taking dependency relationships among the touch cells in the current touch cell combination into consideration. Thereafter, in operation S230, the apparatus compares the first probability value 200a with the second probability value 200b. If the first probability value 200a is greater than the second probability value 200b, the apparatus determines that the arbitrary handgrip posture is a registered handgrip posture. Conversely, if the first probability value 200a is less than the second probability value 200b, the apparatus determines the arbitrary handgrip posture is an unregistered handgrip posture.

FIG. 3 is a block diagram of an apparatus 300 for controlling a portable device according to an embodiment of the present invention. Referring to FIG. 3, the apparatus 300 includes a touch sensor 310, a storage unit 320, a determination unit 330, a first calculation unit 340, a second calculation unit 350, and an output unit 360.

The touch sensor 310 comprises a plurality of touch cells which can be selectively chosen by the touch of a user according to how the user grabs the apparatus 300 with his/her hands. The touch cells can independently sense whether they are currently being touched by the user. And, when touched, a touch cell is chosen. The apparatus 300 performs a function corresponding to a touch cell combination of the touched cells (hereinafter referred to as the current touch cell combination) resulting from a handgrip posture adopted by the user.

The touch sensor 310 may be an electrostatic-capacitive touch sensor. In this case, the touch cells of the touch sensor 310 may be formed of a dielectric material such as rubber, plastic, or glass. In this case, the touch sensor 310 may react not only to the electrostatic capacitances of different objects but also to changes in the electrostatic capacitance of a single object. Accordingly, the touch cells of the touch sensor 310 may be formed of a material which is robust to changes in an external environment such as temperature variations or humidity variations.

The storage unit 320 stores occurrence number information indicating the number of occurrences of each of a plurality of touch cell combinations, and a plurality of function execution signals respectively corresponding to the plurality of touch cell combinations. In order to enable the apparatus 300 to perform a function, the user must properly grab the apparatus 300 by adopting a handgrip posture corresponding to the function. When the user adopts a predetermined handgrip posture, the touch cells of the touch sensor 310 are selectively chosen according to the predetermined handgrip posture, thus generating a predetermined touch cell combination.

In other words, in order to enable the apparatus 300 to perform a plurality of functions, the user must appropriately grab the apparatus 300 by adopting a plurality of handgrip postures respectively corresponding to the plurality of functions. The pattern of the current touch cell combination varies according to a handgrip posture adopted by the user. When the current touch cell combination is determined to be a registered touch cell combination corresponding to a predetermined function, dependency relationships are likely to exist among the touch cells in the current touch cell combination even if the current touch cell combination is slightly different from its registered counterpart.

Therefore, the storage unit 320 may store occurrence number information indicating the number of occurrences of each of the plurality of touch cell combinations. The number of occurrences of a touch cell combination is determined in consideration of dependency relationships among a plurality of touch cells in the touch cell combination. For example, if the touch sensor 310 of the apparatus 300 comprises a first touch cell and a second touch cell, of the following four touch cell combinations can be generated: the first and second touch cells are both chosen; only the first touch cell is chosen; only the second touch cell is chosen; and neither of the first and second touch cells are chosen. In this case, the storage unit 320 may store occurrence number information indicating the number of occurrences of each of the four touch cell combinations. The occurrence number information stored in the storage unit 320 may be periodically updated.

A function execution signal is a control command for controlling an operation of the apparatus 300. Non-limiting examples of the control command include a control command for allowing the user to have a phone conversation, to input text messages, to play games, and to watch multimedia content. When a function execution signal is generated, the apparatus 300 performs a function corresponding to the generated function execution signal.

The storage unit 320 may store a plurality of function execution signals respectively corresponding to the plurality of touch cell combinations.

The storage unit 320 may be a module to/from which data can be input/output, such as, by way of non-limiting examples, a hard disc, a flash memory, a compact flash (CF) card, a secure digital (SD) card, a smart media (SM) card, a multimedia card (MMC), or a memory stick. The storage unit 320 may be included in the apparatus 300 or in an additional external device.

The first calculation unit 340 calculates a first probability value for the current touch cell combination sensed by the touch sensor 310 in consideration of dependency relationships, if any, among the touch cells in the current touch cell combination. The first calculation unit 340 may calculate the first probability value with reference to the occurrence number information stored in the storage unit 320.

The first probability value obtained by the first calculation unit 340 is a probability value determined in consideration of the dependency relationships among the touch cells in the current touch cell combination, based on the assumption that the current touch cell combination is a registered touch cell combination.

The second calculation unit 350 calculates a second probability value for the current touch cell combination without considering the dependency relationships among the touch cells in the current touch cell combination. The second calculation unit 350 may calculate the second probability value with reference to the occurrence number information stored in the storage unit 320.

The second probability value obtained by the first calculation unit 350 is a probability value determined without regard to the dependency relationships among the touch cells in the current touch cell combination, based on the assumption that the current touch cell combination is a registered touch cell combination.

The calculation of the first and second probability values will be described later in further detail with reference to FIG. 5.

The determination unit 330 determines whether the current touch cell combination is a registered touch cell combination or an unregistered touch cell combination by comparing the first probability value with the second probability value. If the first probability value is greater than the second probability value, the determination unit 330 determines the current touch cell combination is a registered touch cell combination. Conversely, if the first probability value is less than the second probability value, the determination unit 330 determines the current touch cell combination is an unregistered touch cell combination. The second probability value may serve as a variable threshold for determining whether the first probability value of the current touch cell combination is that of a registered touch cell combination.

If the current touch cell combination is determined to be a registered touch cell combination, the determination unit 330 extracts a function execution signal corresponding to the current touch cell combination from the storage unit 320, and transmits the function execution signal to the output unit 360.

The output unit 360 outputs the function execution signal transmitted by the determination unit 330. Then the apparatus 300 performs a function corresponding to the function execution signal output by the output unit 360.

If the current touch cell combination is determined to be an unregistered touch cell combination, the determination unit 330 may not perform any operation. Alternatively, the determination unit 330 may display, using a display unit (not shown) included in the apparatus 300, a message indicating that an unregistered touch cell combination has been detected.

FIG. 4 is a diagram of a registration model 415 for calculating probability values for a registered touch cell combination and for an unregistered touch cell combination according to an embodiment of the present invention. Referring to FIG. 4, Bayesian networks 410 and 420 respectively represent a registered touch cell combination and an unregistered touch cell combination. The Bayesian network 410 comprises a plurality of nodes (1-5) respectively corresponding to a plurality of touch cells that generate the registered touch cell combination, and the Bayesian network 420 comprises a plurality of nodes (1-5) respectively corresponding to a plurality of touch cells that generate the unregistered touch cell combination.

Referring to FIG. 4, dependency relationships existing among the nodes of the Bayesian network 410 are respectively represented by arcs. The registration model 415 comprises dependency relationship information of a plurality of touch cell combinations. Dependency relationship information of a touch cell combination is information regarding dependency relationships which may exist among a plurality of nodes of a Bayesian network representing the touch cell combination. For example, assuming that a first touch cell combination may indicate that the first touch cell combination corresponds to a Bayesian network whose second, third, fourth, and fifth nodes are in a dependency relationship and a second touch cell combination may indicate that the second touch cell combination corresponds to a Bayesian network whose third, fourth, and fifth nodes are in a dependency relationship, and the registration model 415 may comprise dependency relationship information indicating the dependency relationships among the second, third, fourth, and fifth nodes of the first touch cell combination and dependency relationship information indicating the dependency relationships among the second, third, fourth, and fifth nodes of the second touch cell combination. The model for unregistered touch pattern is constructed by removing all the dependency arcs of model 415 and training the model with the training data. By the model construction method, the necessity to collect unregistered pattern data is largely reduced and the unregistered model can be constructed by using only the registered model data.

A distribution $X_{A|X_1}, \ldots, x_n$ of registration model A may be defined by Equation (1):

$$X_{A|X_1,\ldots,X_n} = \frac{\text{Occurrence Number}(A = a, X_1 = x_1, \ldots, X_n = x_n)}{\text{Occurrence Number}(X_1 = x_1, \ldots, X_n = x_n)}$$

where $X_1$ through $X_n$ represent first through n-th nodes of a Bayesian network, $x_1$ through $x_n$ represent the values to which the first through n-th nodes $X_1$ through $X_n$ are respectively set, and a indicates the type of registration model A. The values $x_1$ through $x_n$ to which the first through n-th nodes $X_1$ through $X_n$ are respectively set may be altered according to whether a plurality of touch cells respectively corresponding to the first through n-th nodes $X_1$ through $X_n$ are chosen. Accordingly, the distribution of registration model A may be defined as the ratio of the number of occurrences of a node combination that satisfies the following equations: $A=a$, $X_1=x_1$, $X_2=x_2$, . . . , $X_n=x_n$; and the number of occurrences of a node combination that satisfies the following equations: $X_1=x_1, X_2=x_2, \ldots, X_n=x_n$.

Also, a probability value regarding a predetermined touch cell in a registered touch cell combination can be defined by Equation (2):

$$P(X_1, X_2, \ldots, X_n) = \prod_{i=1}^{N} P(X_i | pa(X_i))$$

$$pa(X_i) = \{Y | \exists_{A \in Arcs} A(Y, X_i)\}$$

where X1 though XN represent first through N-th nodes of a Bayesian network, P represents a probability that a predetermined node combination can be generated, pa(Xi) represents a group of nodes that affect the i-th node Xi (where i is an integer between 1 and N), i.e., a group of nodes from which a plurality of arcs are respectively drawn to the i-th node $X_i$ begin, and Y represents a node from which an arc $A(Y, X_i)$ is drawn to the i-th node $X_i$.

In other words, a probability value regarding the i-th node $X_i$ may be determined by the node Y from which the arc $A(Y, X_i)$ is drawn to the i-th node $X_i$.

In sum, there is a dependency relationship among a plurality of nodes of a Bayesian network (e.g., the Bayesian network 410 illustrated in FIG. 4) corresponding to a registered combination of touch cells, whereas there is no dependency relationship among a plurality of nodes of a Bayesian network (e.g., the Bayesian network 420 illustrated in FIG. 4) corresponding to an unregistered combination of touch cells. Therefore, no arcs are present between the nodes of the Bayesian network 420 corresponding to an unregistered combination of touch cells.

The Bayesian network 420 corresponds to an unregistered combination of touch cells. An unregistered combination of touch cells can be determined by a registered combination of touch cells. In other words, an unregistered combination of touch cells may be obtained by removing all arcs present in a Bayesian network corresponding to a registered combination of touch cells, i.e., the Bayesian network 410.

Figure 5:
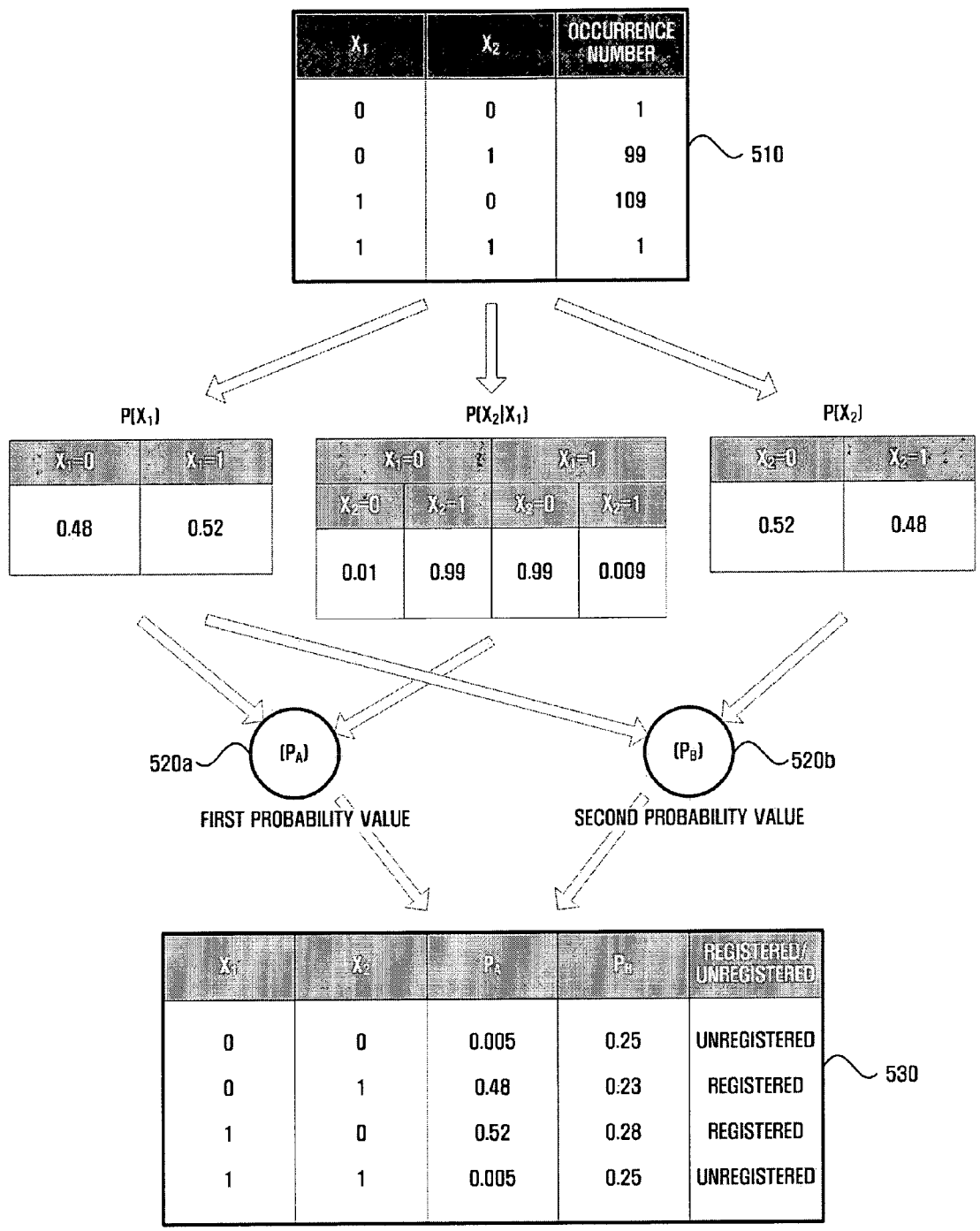
FIG. 5 presents a plurality of tables presenting the number of occurrences of each of a plurality of touch cell combinations, and a plurality of first probability values and a plurality of second probability values respectively corresponding to the touch cell combinations.

FIG. 5 illustrates a plurality of tables presenting the number of occurrences of each of a plurality of touch cell combinations, and a plurality of first probability values and a plurality of second probability values respectively corresponding to the touch cell combinations. The use of the tables is hereafter explained with reference to the apparatus of FIG. 3 for enhanced clarity only.

Referring to FIGS. 3 and 5, assume that the touch sensor 310 of the apparatus 300 illustrated in FIG. 3 comprises two touch cells, i.e., a first touch cell $X_1$ and a second touch cell $X_2$. When the first touch cells $X_1$ and the second touch cell $X_2$ are not chosen by a user, the first touch cells $X_1$ and the second touch cell $X_2$ have a value of 0. Conversely, when the first touch cells $X_1$ and the second touch cell $X_2$ are chosen by the user, the first touch cells $X_1$ and the second touch cell $X_2$ have a value of 1.

A table 510 presents the number of occurrences of each of a plurality of touch cell combinations which can be made by the user using the first touch cells $X_1$ and the second touch cell $X_2$. However, the number of occurrences of each of the touch cell combinations can be updated after a long use of the apparatus 300.

As described above, there is a dependency relationship between a plurality of touch cells that generate a registered touch cell combination. Assuming that the first touch cell $X_1$ is affected by the second touch cell $X_1$, a first probability value $P_A$ (520a) can be defined by Equation (3):

$$P_A = P(X_1) \cdot P(X_2|X_1)$$

where $P(X_1)$ represents a probability that the first touch cell $X_1$ can have a value of either 0 or 1, and $P(X_2|X_1)$ represents a probability that the value of the second touch cell $X_2$ can be determined to be 0 or 1 according to the value of the first touch cell $X_1$.

The calculation of the probability $P(X_1)$ will hereinafter be described in detail with reference to the table 510 of FIG. 5. Referring to a plurality of touch cell combinations listed in the table 510 of FIG. 5, the total number of occurrences of all the touch cell combinations is 210 (1+99+109+1), the number of occurrences of the touch cell combinations obtained when the first touch cell $X_1$ is not chosen, i.e., $X_1=0$, is 100 (99+1), and the number of occurrences of the touch cell combinations obtained when the first touch cell $X_1$ is chosen, i.e., $X_1=1$, is 110 (109+1). Thus, a probability $P(X_1=0)$ that the first touch cell $X_1$ can have a value of 0 is determined to be about 0.48 (100/210), and a probability $P(X_1=1)$ that the first touch cell $X_1$ can have a value of 1 is about 0.52 (110/210).

The calculation of the probability $P(X_2|X_1)$ will hereinafter be described in detail with reference to the table 510 of FIG. 5. Referring to the table 510 of FIG. 5, since the number of occurrences of the touch cell combinations obtained when the first touch cell $X_1$ is not chosen, i.e., $X_1=0$, is 100 and the number of occurrences of the touch cell combination obtained when none of the first and second touch cells $X_1$ and $X_2$ are chosen, i.e., $X_1=X_2=0$, is 1, a probability $P(X_2=0|X_1=0)$ is equal to 1/100. Since the number of occurrences of the touch cell combinations obtained when the first touch cell $X_1$ is not chosen, i.e., $X_1=0$, is 100 and the number of occurrences of the touch cell combinations obtained when the second touch cell $X_2$ is chosen, i.e., $X_2=1$, is 99, a probability $P(X_2=1|X_1=0)$ is equal to 99/100. Since the number of occurrences of the touch cell combinations obtained when the first touch cell $X_1$ is chosen, i.e., $X_1=1$, is 110 and the number of occurrences of the touch cell combination obtained when the first touch cell $X_1$ is chosen but the second touch cell $X_2$ is not chosen, i.e., $X_1=1$ and $X_2=0$, is 109, a probability $P(X_2=0|X_1=1)$ is equal to 109/110. Since the number of occurrences of the touch cell combinations obtained when the first touch cell $X_1$ is chosen, i.e., $X_1=1$, is 110 and the number of occurrences of the touch cell combination obtained when the first touch cell $X_1$ and the second touch cell $X_2$ are both chosen, i.e., $X_1=X_2=1$, a probability $P(X_2=1|X_1=1)$ is equal to 1/110.

A plurality of first probability values $P_A$ (520a) respectively corresponding to the touch cell combinations listed in the table 510 can be obtained using the aforementioned computation manner. The first probability values $P_A$ (520a) are listed in a table 530 of FIG. 5.

In the meantime, there is no dependency relationship among a plurality of touch cells in an unregistered touch cell combination. Accordingly, a second probability value $P_B$ (520b), which is determined based on a probability regarding the first touch cell $X_1$ and a probability regarding the second touch cell $X_2$, can be defined by Equation (4):

$$P_B = P(X_1) \cdot P(X_2)$$

where $P(X_1)$ represents a probability that the first touch cell $X_1$ can have a value of either 0 or 1, and $P(X_2)$ represents a probability that the second touch cell $X_2$ can have a value of either 0 or 1. In this case, there is no dependency relationship between the probability $P(X_1)$ and the probability $P(X_2)$.

The calculation of the probability $P(X_1)$ will hereinafter be described in detail with reference to the table 510 of FIG. 5. Referring to the table 510 of FIG. 5, the total number of occurrences of all the touch cell combinations is 210 (1+99+109+1), the number of occurrences of the touch cell combinations obtained when the first touch cell $X_1$ is not chosen, i.e., $X_1=0$, is 100, and the number of occurrences of the touch cell combinations obtained when the first touch cell $X_1$ is chosen, i.e., $X_1=1$, is 110. Thus, a probability $P(X_1=0)$ that the first touch cell $X_1$ can have a value of 0 is determined to be about 0.48 (100/210), and a probability $P(X_1=1)$ that the first touch cell $X_1$ can have a value of 1 is about 0.52 (110/210).

The calculation of the probability $P(X_2)$ will hereinafter be described in detail with reference to the table 510 of FIG. 5. Referring to the table 510 of FIG. 5, the total number of occurrences of all the touch cell combinations is 210 (1+99+109+1), the number of occurrences of the touch cell combinations obtained when the second touch cell $X_2$ is not chosen, i.e., $X_2=0$, is 110, and the number of occurrences of the touch cell combinations obtained when the second touch cell $X_2$ is chosen, i.e., $X_2=1$, is 100. Thus, a probability $P(X_2=0)$ that the second touch cell $X_2$ can have a value of 0 is determined to be about 0.52 (110/210), and a probability $P(X_2=1)$ that the second touch cell $X_2$ can have a value of 1 is about 0.48 (100/210).

A plurality of second probability values $P_B$ (520b) respectively corresponding to the touch cell combinations listed in the table 510 can be obtained using the aforementioned computation manner. The second probability values $P_B(520b)$ are listed in a table 530 of FIG. 5.

Referring to FIGS. 3 and 5, the first probability value 520a and the second probability value 520b for the current touch cell combination are respectively obtained by the first calculation unit 340 and the second calculation unit 350. Then, the first probability value 520a and the second probability value 520b for the current touch cell combination are transmitted to the determination unit 330. The determination unit 330 determines whether the current touch cell combination is a registered touch cell combination based on the first and second probability values 520a and 520b for the current touch cell combination. In detail, if the first probability value 520a for the current touch cell combination is greater than the second probability value 520b for the current touch cell combination, the determination unit 330 determines the current touch cell combination to be a registered touch cell combination. Conversely, if the first probability value 520a for the current touch cell combination is less than the second probability value 520b for the current touch cell combination, the determination unit 330 determines the current touch cell combination to be an unregistered touch cell combination.

According to the table 510 of FIG. 5, only one out of a total of 210 touch cell combinations satisfies the following condition: $X_1=X_2=0$; and is thus considered unlikely to occur. Conversely, 99 out of the 210 touch cell combinations satisfy the following condition: $X_1=0$ and $X_2=1$; and are thus considered likely to occur. In order to determine whether the current touch cell combination is a registered touch cell combination, the determination unit 330 may compare the first probability value 520a for the current touch cell combination with the second probability value 520b for the current touch cell combination. In detail, referring to FIG. 5, the first probability value 520a for the touch cell combination obtained when $X_1=X_2=0$ is 0.005, and the second probability value 520b for the touch cell combination obtained when $X_1=X_2=0$ is 0.25. If the current touch cell combination is the same as the touch cell combination obtained when $X_1=X_2=0$, the determination unit 330 may determine the current touch cell combination to be an unregistered touch cell combination because the second probability value 520b for the current touch cell combination is greater than the first probability value 520a for the current touch cell combination. Referring to FIG. 5, the first probability value 520a for the touch cell combination obtained when $X_1=0$ and $X_2=1$ is 0.48, and the second probability value 520b for the touch cell combination obtained when $X_1=0$ and $X_2=1$ is 0.23. If the current touch cell combination is the same as the touch cell combination obtained when $X_1=0$ and $X_2=1$, the determination unit 330 may determine the current touch cell combination to be a registered touch cell combination because the first probability value 520a for the current touch cell combination is greater than the second probability value 520b for the current touch cell combination.

Figure 6:
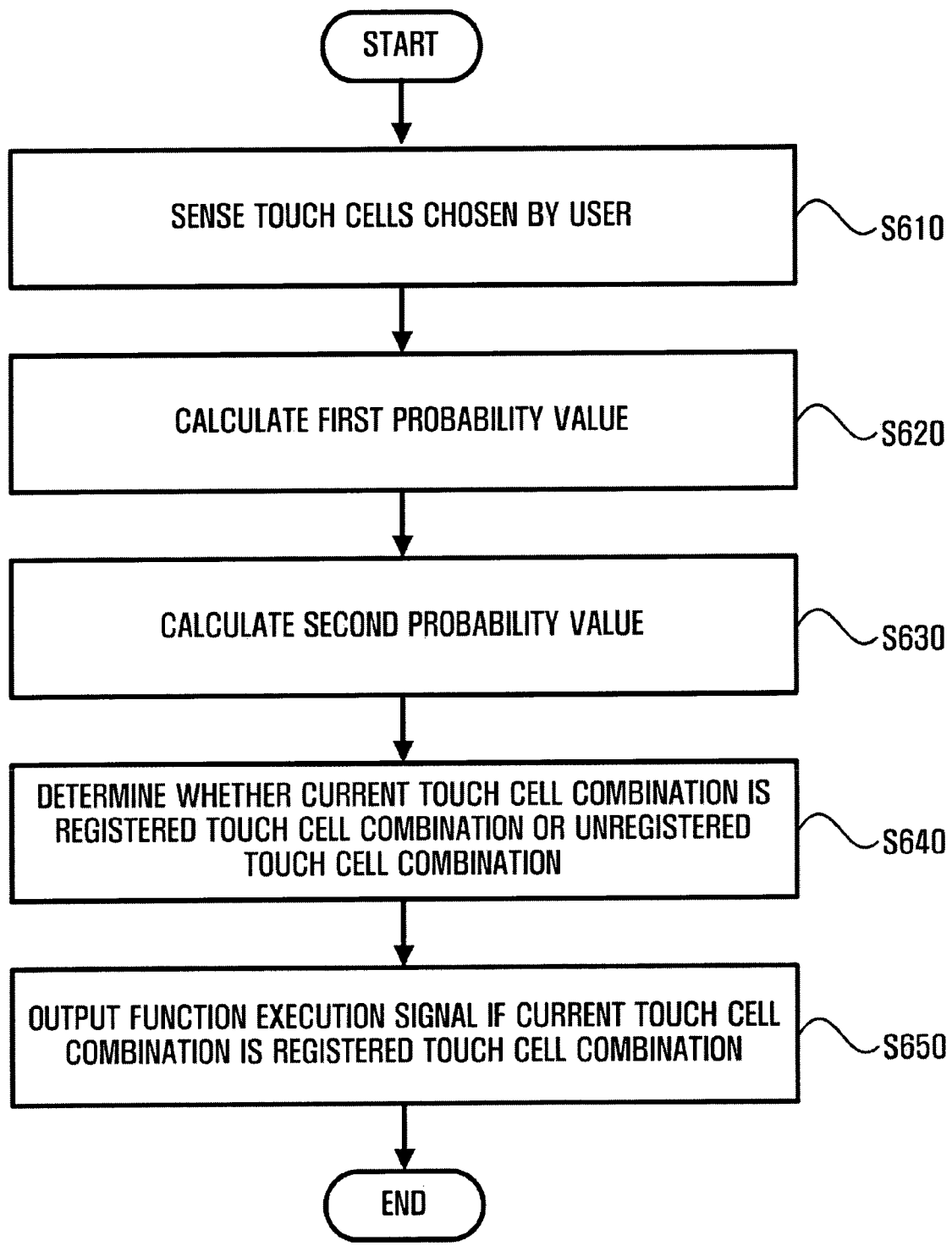
FIG. 6 is a flowchart illustrating a method of controlling a portable device using a touch sensor according to an embodiment of the present invention.

FIG. 6 is a flowchart illustrating a method of controlling a portable device using a touch sensor according to an embodiment of the present invention. This method is described with reference to the apparatus of FIG. 3 for ease of explanation only.

Referring to FIGS. 3 and 6, the apparatus 300 illustrated in FIG. 3 allows a user to touch and choose at least one of the touch cells of the touch sensor 310. In detail, in order for the apparatus 300 to perform a desired function, the user may grab the apparatus 300 with his/her hands by adopting a predefined handgrip posture. In operation S610, the touch sensor 310 determines which of the touch cells of the touch sensor 310 are currently being touched by the user, and senses a current touch cell combination, which is a combination of touched touch cells.

Here, the touch sensor 310 may be an electrostatic-capacitive touch sensor. In this case, the touch cells of the touch sensor 310 may be formed of a dielectric material such as rubber, plastic, or glass. In this case, the touch sensor 310 may react not only to the electrostatic capacitances of different objects but also to changes in the electrostatic capacitance of a single object. Accordingly, the touch cells of the touch sensor 310 may be formed of a material which is less sensitive to external environmental conditions such as temperature and humidity.

The current touch cell combination is transmitted to the determination unit 330. Then, the determination unit 330 transmits the current touch cell combination to the first calculation unit 340. In operation S620, the first calculation unit 340 calculates a first probability value for the current touch cell combination while taking dependency relationships, if any, among a plurality of touch cells in the current touch cell combination into consideration. The first calculation unit 340 may reference occurrence number information stored in the storage unit 320 to determine the second probability value for the current touch cell combination.

The determination unit 330 also transmits the current touch cell combination to the second calculation unit 350. In operation S630, the second calculation unit 350 calculates a second probability value for the current touch cell combination without taking dependency relationships among the touch cells in the current touch cell combination into consideration. The second calculation unit 350 may reference the occurrence number information stored in the storage unit 320 to determine the second probability value for the current touch cell combination.

According to the present embodiment, the determination unit 330 may transmit the current touch cell combination to the first and second calculation unit 340 and 350 at the same time so that the first and second calculation unit 340 and 350 can generate the first and second probability values for the current touch cell combination at the same time.

The first and second probability values for the current touch cell combination are transmitted to the determination unit 330. In operation S640, the determination unit 330 determines whether the current touch cell combination is a registered touch cell combination or an unregistered touch cell combination. In detail, if the first probability value for the current touch cell combination is greater than the second probability value for the current touch cell combination, the determination unit 330 determines the current touch cell combination is one of a plurality of registered touch cell combinations stored in the storage unit 320. Conversely, if the first probability value for the current touch cell combination is less than the second probability value for the current touch cell combination, the determination unit 330 determines the current touch cell combination is an unregistered touch cell combination.

If the current touch cell combination is determined to be one of the registered touch cell combinations stored in the storage unit 320, the determination unit 330 extracts a function execution signal corresponding to the current touch cell combination from the storage unit 320, and transmits the extracted function execution signal to the output unit 360. In operation S650, the output unit 360 outputs the function execution signal transmitted by the determination unit 330. Then, the apparatus 300 performs a function corresponding to the function execution signal output by the output unit 360.

FIG. 7 presents experimental results obtained using a plurality of registered touch cell combinations and a plurality of unregistered touch cell combinations according to an embodiment of the present invention. Specifically, the experimental results illustrated in FIG. 7 were obtained by letting a total of 21 users to grab the apparatus 300 illustrated in FIG. 3 by adopting seven handgrip postures five times each. Referring to FIG. 7, assume that the touch sensor 310 of the apparatus 300 is equipped with a total of 19 touch cells.

An upper view 710 of FIG. 7 illustrates the seven handgrip postures, i.e., a handgrip posture 711 for making a phone call, a first handgrip posture 712 for inputting text messages, a second handgrip posture 713 for inputting text messages, a first handgrip posture 714 for taking photos, a second handgrip posture 715 for taking photos, a handgrip posture 716 for playing games, and a handgrip posture 717 for viewing multimedia content.

Referring to FIG. 7, a Bayesian network 720a corresponds to a registered touch cell combination, and a Bayesian network 720b corresponds to an unregistered touch cell combination. There are dependency relationships among a plurality of nodes of the Bayesian network 720a, whereas there are no dependency relationships among a plurality of nodes of the Bayesian network 720b. Referring to the dependency relationships among the nodes of the Bayesian network 720a, only those which are determined to be statistically valid through the analysis of a predetermined collection of data are represented by arcs.

According to the experimental results presented in FIG. 7, the apparatus 300 can achieve a precision of 91.2% for registered touch cell combinations and a precision of 88% for unregistered touch cell combinations.

The apparatus and method for controlling a portable device according to the above-described embodiments of the present invention provides the following advantages.

First, the apparatus and method for controlling a portable device according to the above-described embodiments of the present invention can prevent a portable device comprising a touch sensor equipped with a plurality of touch cells from performing a function in response to an unregistered touch cell combination.

Second, the apparatus and method for controlling a portable device according to the above-described embodiments of the present invention can establish a registration model even for a plurality of touch cell combinations corresponding to unregistered handgrip postures based on data regarding a plurality of touch cell combinations corresponding to a limited number of registered handgrip postures. Theoretically, there are an unlimited number of unregistered handgrip postures. Thus, in order to establish a registration model for unregistered handgrip postures, a considerable amount of data is required. However, according to the above-described embodiments of the present invention, it is possible to establish a registration model for unregistered handgrip postures based on a relatively small amount of data regarding a limited number of registered handgrip postures.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for controlling a portable device by a handgrip posture of a user, comprising:
    a touch sensor which comprises a plurality of touch cells, wherein a current combination of touch cells are chosen by the handgrip posture of the user;
    a first calculation unit which calculates a first probability value that the current combination of touch cells is a registered touch cell combination while taking dependency relationships among the chosen touch cells of the current touch cell combination into consideration;
    a second calculation unit which calculates a second probability value that the current combination of touch cells is a registered touch cell combination without taking the dependency relationships among the chosen touch cells of the current touch cell combination into consideration;
    a determination unit which determines whether the current touch cell combination is registered touch cell combination or unregistered touch cell combination with reference to the first probability value and the second probability value; and
    an output unit which outputs a function execution signal according to the results of the determining,
    wherein the function execution signal controls the portable device to perform a function.

2. The apparatus of claim 1, wherein the touch sensor is an electrostatic-capacitive touch sensor.

3. The apparatus of claim 1, wherein the first calculation unit calculates the first probability value with reference to occurrence number information specifying the number of occurrences of the current touch cell combination,
    wherein the occurrence number information is stored in a storage unit after touch cells are chosen by the user.

4. The apparatus of claim 1, wherein the second calculation unit calculates the second probability value with reference to occurrence number information specifying the number of occurrences of the current touch cell combination,
    wherein the occurrence number information is stored in a storage unit after touch cells are chosen by the user.

5. The apparatus of claim 1, wherein, when the first probability value is greater than the second probability value, the determination unit determines that the current touch cell combination is registered touch cell combination.

6. The apparatus of claim 1, wherein, when the first probability value is less than the second probability value, the determination unit determines that the current touch cell combination is unregistered touch cell combination.

7. The apparatus of claim 1 further comprising a storage unit which stores occurrence information specifying a number of occurrences of the current touch cell combination and the function execution signal.

8. The apparatus of claim 1, wherein the function execution signal controls the portable device to perform at least one of receiving an incoming call, displaying a screen image to input text messages, taking a photographic image, and displaying a game screen.

9. The apparatus of claim 1, wherein there is a dependency relationship among a plurality of nodes of a Bayesian network corresponding to registered combination of touch cells when the first calculation unit calculates the first probability value while taking dependency relationships among the chosen touch cells of the current touch cell combination into consideration; and there is no dependency relationship among a plurality of nodes of a Bayesian network corresponding to unregistered combination of touch cells when the second calculation unit calculates the second probability value without taking the dependency relationships among the chosen touch cells of the current touch cell combination into consideration.

10. A method of controlling a portable device by a handgrip posture of a user, comprising:

obtaining a current touch cell combination by identifying a plurality of touch cells which are chosen by the handgrip posture of the user;

calculating a first probability value while taking dependency relationships among the touched touch cells into consideration;

calculating a second probability value without taking the dependency relationships among the touched touch cells into consideration;

determining whether the current touch cell combination is a registered touch cell combination or an unregistered touch cell combination with reference to the first probability value and the second probability value; and outputting a function execution signal according to the results of the determining, wherein the function execution signal controls the portable device to perform a function, and wherein the method is performed using at least one processor.

11. The method of claim 10, wherein the touch sensor is an electrostatic-capacitive touch sensor.

12. The method of claim 10, wherein the calculating a first probability value comprises calculating the first probability value with reference to occurrence number information specifying the number of occurrences of the current touch cell combination, wherein the occurrence number information is stored in a storage unit after touch cells are chosen by the user.

13. The method of claim 10, wherein the calculating a second probability value comprises calculating the second probability value with reference to occurrence number information specifying the number of occurrences of the current touch cell combination, wherein the occurrence number information is stored in a storage unit after touch cells are chosen by the user.

14. The method of claim 10, wherein the determining comprises determining the current touch cell combination to be registered touch cell combination when the first probability value is greater than the second probability value.

15. The method of claim 10, wherein the determining comprises determining the current touch cell combination to be unregistered touch cell combination when the first probability value is less than the second probability value.

16. The method of claim 10 further comprising storing occurrence information specifying the number of occurrences of the current touch cell combination and the function execution signal in a storage unit.

17. The method of claim 10, wherein the function execution signal controls the portable device to perform at least one of receiving an incoming call, displaying a screen image to input text messages, taking a photographic image, and displaying a game screen.

18. The method of claim 10, wherein there is a dependency relationship among a plurality of nodes of a Bayesian network corresponding to registered combination of touch cells when calculating the first probability value while taking dependency relationships among the touched touch cells into consideration; and there is no dependency relationship among a plurality of nodes of a Bayesian network corresponding to unregistered combination of touch cells when calculating the second probability value without taking the dependency relationships among the touched touch cells into consideration.

19. A method of controlling a portable device by a handgrip posture of a user, comprising:

identifying a touch cell combination of touched ones of a plurality of touch cells which are chosen by the handgrip posture of the user;

calculating a first probability value while taking dependency relationships among the touch cells of the current touch cell combination into consideration and calculating a second probability value without taking the dependency relationships among the current touch cells of the touch cell combination into consideration;

determining whether the touch cell combination is a registered touch cell combination or an unregistered touch cell combination, the touch cell combination being registered when the first probability value is greater than the second probability value, the touch cell being an unregistered touch cell combination when the second probability value is greater than the first; and outputting a control command controlling an operation of the portable device when the touch cell combination is a registered touch cell combination, the command corresponding to the touch cell combination, wherein the control command controls the portable device to perform a function, and wherein the method performed using at least one processor.

20. The method of claim 19, wherein the dependency relationships are based on dependency relationship information regarding dependency relationships which exist among a plurality of nodes of a Bayesian network representing the touch cell combination.

21. The method of claim 19, wherein the control command controls the portable device to perform at least one of receiving an incoming call, displaying a screen image to input text messages, taking a photographic image, and displaying a game screen.

22. The method of claim 19, wherein there is a dependency relationship among a plurality of nodes of a Bayesian network corresponding to a registered combination of touch cells when calculating the first probability value while taking dependency relationships among the touch cells of the current touch cell combination into consideration; and there is no dependency relationship among a plurality of nodes of a Bayesian network corresponding to an unregistered combination of touch cells when calculating the second probability value without taking the dependency relationships among the touch cells of the current touch cell combination into consideration.

23. A computer-readable storage medium encoded with processing instructions for causing a processor to execute a method of controlling a portable device by a handgrip posture of a user, comprising:
   obtaining a current touch cell combination by identifying a plurality of touch cells which are chosen by the handgrip posture of the user;
   calculating a first probability value while taking dependency relationships among the touched touch cells into consideration;
   calculating a second probability value without taking the dependency relationships among the touched touch cells into consideration;
   determining whether the current touch cell combination is a registered touch cell combination or an unregistered touch cell combination with reference to the first probability value and the second probability value; and
   outputting a function execution signal according to the results of the determining,
   wherein the function execution signal controls the portable device to perform a function.

24. The method of claim 23, wherein the function execution signal controls the portable device to perform at least one of receiving an incoming call, displaying a screen image to input text messages, taking a photographic image, and displaying a game screen.

25. The method of claim 23, wherein there is a dependency relationship among a plurality of nodes of a Bayesian network corresponding to a registered combination of touch cells when calculating the first probability value while taking dependency relationships among the touched touch cells into consideration; and
   there is no dependency relationship among a plurality of nodes of a Bayesian network corresponding to an unregistered combination of touch cells when calculating the second probability value without taking the dependency relationships among the touched touch cells into consideration.

26. A computer-readable storage medium encoded with processing instructions for causing a processor to execute a method of controlling a portable device by a handgrip posture of a user, comprising:
   identifying a touch cell combination of touched ones of a plurality of touch cells which are chosen by the handgrip posture of the user;
   calculating a first probability value while taking dependency relationships among the touch cells of the current touch cell combination into consideration and calculating a second probability value without taking the dependency relationships among the touch cells of the current touch cell combination into consideration;
   determining whether the touch cell combination is a registered touch cell combination or an unregistered touch cell combination, the touch cell combination being registered when the first probability value is greater than the second probability value, the touch cell being an unregistered touch cell combination when the second probability value is greater than the first; and
   outputting a control command controlling an operation of the portable device when the touch cell combination is a registered touch cell combination, the command corresponding to the touch cell combination,
   wherein the control command controls the portable device to perform a function.

27. The method of claim 26, wherein the control command controls the portable device to perform at least one of receiving an incoming call, displaying a screen image to input text messages, taking a photographic image, and displaying a game screen.

28. The method of claim 26, wherein there is a dependency relationship among a plurality of nodes of a Bayesian network corresponding to a registered combination of touch cells when calculating the first probability value while taking dependency relationships among the touch cells of the current touch cell combination into consideration; and
   there is no dependency relationship among a plurality of nodes of a Bayesian network corresponding to an unregistered combination of touch cells when calculating the second probability value without taking the dependency relationships among the touch cells of the current touch cell combination into consideration.

* * * * *

UNITED STATES PATENT AND TRADEMARK OFFICE
CERTIFICATE OF CORRECTION

PATENT NO.      : 7,617,168 B2                                              Page 1 of 1
APPLICATION NO. : 11/528347
DATED           : November 10, 2009
INVENTOR(S)     : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Nineteenth Day of October, 2010

David J. Kappos
*Director of the United States Patent and Trademark Office*